(12) United States Patent
Cho (10) Patent No.: US 9,505,355 B1
(45) Date of Patent: Nov. 29, 2016

(54) DUAL-MOUNT PHONE AND TABLET STAND

(71) Applicant: Richard H. Cho, Sunnyvale, CA (US)

(72) Inventor: Richard H. Cho, Sunnyvale, CA (US)

( * ) Notice: Subject to any disclaimer, the term of this patent is extended or adjusted under 35 U.S.C. 154(b) by 0 days.

(21) Appl. No.: 14/881,128

(22) Filed: Oct. 12, 2015

(51) Int. Cl.
*F16B 47/00* (2006.01)
*B60R 11/02* (2006.01)
*F16M 11/14* (2006.01)
*F16B 1/00* (2006.01)
*B60R 11/00* (2006.01)

(52) U.S. Cl.
CPC ........ *B60R 11/0241* (2013.01); *B60R 11/0252* (2013.01); *F16M 11/14* (2013.01); *A45F 2200/0516* (2013.01); *A45F 2200/0525* (2013.01); *B60R 2011/0003* (2013.01); *B60R 2011/007* (2013.01); *B60R 2011/0059* (2013.01); *B60R 2011/0078* (2013.01); *F16B 2001/0035* (2013.01)

(58) Field of Classification Search
CPC .................. H04M 2001/0204; H04M 1/0243; H04M 1/0249; H04M 1/72575
See application file for complete search history.

(56) References Cited

U.S. PATENT DOCUMENTS

| | | | |
|---|---|---|---|
| 8,706,175 B2 * | 4/2014 | Cho ..................... | F16M 11/041 248/205.1 |
| 9,038,971 B1 * | 5/2015 | Guthrie ................ | F16M 13/022 248/121 |
| 2004/0188576 A1 * | 9/2004 | Carnevali .............. | F16M 11/04 248/206.5 |
| 2007/0120026 A1 * | 5/2007 | Chen ...................... | F16B 47/00 248/205.5 |

\* cited by examiner

*Primary Examiner* — Bobbak Safaipour
(74) *Attorney, Agent, or Firm* — Joseph Stecewycz (57) ABSTRACT

The invention is a dual mount phone and tablet stand comprising: a base unit including two base sockets; two mounting arms, each having a planar disc end, a ball end, and a stem extending between the planar disc end and the ball end; two magnets secured to the mounting arms; two upper securing flaps extending from the base unit; a lower securing flap extending from the base unit and disposed between the upper securing flaps; and a flap adjustment knob rotatably secured in the lower securing flap.

20 Claims, 7 Drawing Sheets

DUAL-MOUNT PHONE AND TABLET STAND

FIELD OF THE INVENTION

The present invention relates to a system for removably mounting electronic display devices and, in particular, to a mounting stand for use in a vehicle to support a communication device or a computer tablet.

BACKGROUND OF THE INVENTION

It has been known in the art for some years that, because of their popularity, a user may bring along one or more types of mobile communication devices for use and access throughout the day. At times when the user is travelling, in a vehicle or in another type of conveyance, there may not be a practical way of supporting the mobile communication device, and the user may find it necessary to manually hold the device, or to place the device on a surface for viewing without also providing adequate support.

Conventional support devices are known, but many of these supporting methods tend to be awkward or may be located in such a way that the ability of the driver to operate the vehicle is impaired.

What is needed is a compact, secure system of supporting mobile communication devices for display and access, without impairing operation of a vehicle.

BRIEF SUMMARY OF THE INVENTION

In one aspect of the present invention, a dual mount phone and tablet stand comprises: a base unit having a substantially planar base unit surface, the base unit including a first base socket and a second base socket disposed on the base unit surface, the first base socket in spaced apart relationship to the second base socket; a first mounting arm having a first planar disc end, a first ball end, and a first stem extending between the first planar disc end and the first ball end, the first ball end configured so as to be removably attachable to the first base socket; a second mounting arm having a second planar disc end, a second ball end, and a second stem extending between the second planar disc end and the second ball end, the second ball end configured so as to be removably attachable to the second base socket; a first magnet secured to the first mounting arm; a second magnet secured to the second mounting arm; at least one upper securing flap extending from the base unit; a lower securing flap extending from the base unit; and a flap adjustment knob rotatably operable to pivot, with respect to the base unit, one of at least the upper securing flap and the lower securing flap.

In another aspect of the present invention, a dual mount phone and tablet stand comprises: a base unit having a substantially planar surface, the base unit including a first base socket and a second base socket disposed on the planar surface; a first mounting arm having a first planar end, a first ball end, and a first stem extending between the first planar end and the first ball end, the first ball end removably attached to the first base socket; a second mounting arm having a second planar disc end, a second ball end, and a second stem extending between the second planar end and the second ball end, the second ball end removably attached to the second base socket; a first disc-shaped magnet secured to the first planar end; a second disc-shaped magnet secured to the second planar end; a first upper securing flap extending from the base unit, the first upper securing flap having a surface substantially coplanar with the base unit surface; a second upper securing flap extending from the base unit; the second upper securing flap having a surface substantially coplanar with the base unit surface; a lower securing flap extending from the base unit and disposed between the first upper securing flap and the second upper securing flap; and a flap adjustment knob rotatably retained in a threaded hole disposed in the lower securing flap.

The additional features and advantage of the disclosed invention is set forth in the detailed description which follows, and will be apparent to those skilled in the art from the description or recognized by practicing the invention as described, together with the claims and appended drawings.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

The present invention relates generally to a mounting system which enables one or two users to employ hands-free operation while accessing the features of or monitoring the displays of two separate mobile communication devices, particularly when travelling in a vehicle.

Figure 1:
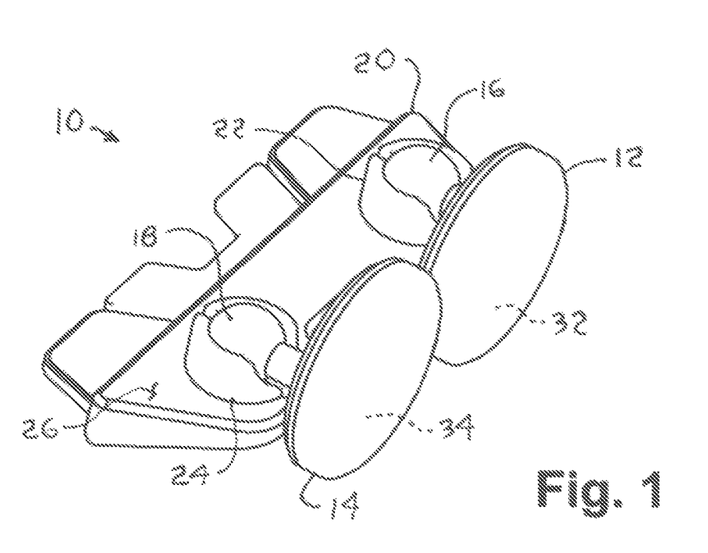
FIG. 1 is an isometric diagrammatical illustration of a dual mount phone and tablet stand having a base unit and mounting arms, as seen from the front, in accordance with the present invention.
Figure 2:
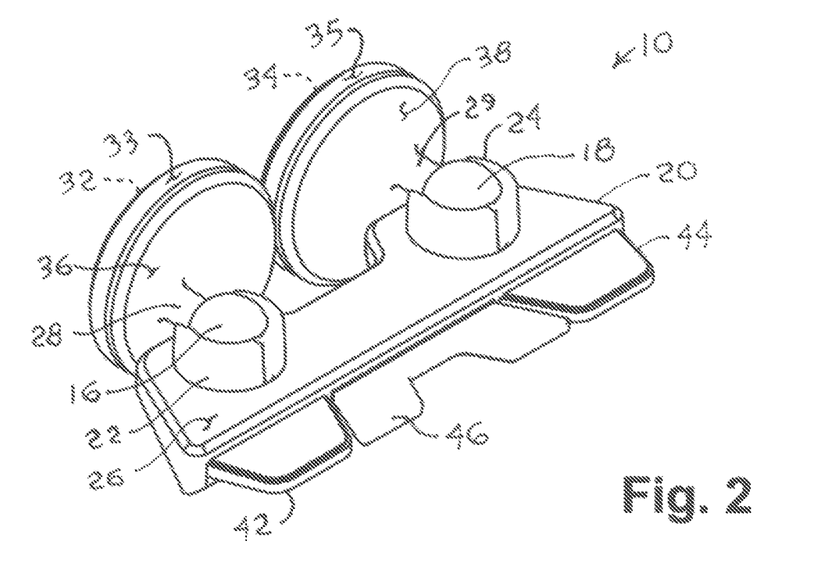
FIG. 2 is an isometric diagrammatical illustration of the dual mount phone and tablet stand of FIG. 1 as seen from the rear.

There is shown in FIGS. 1 and 2 a dual mount phone and tablet stand 10 comprising a base unit 20, a first mounting arm 12, and a second mounting arm 14. Although the first mounting arm 12 is shown in the illustrations as being substantially similar to the second mounting arm 14, it should be understood that the second mounting arm 14 may be dimensionally different from the first mounting arm 12 so as to accommodate mobile communication devices of different form factors.

The first mounting arm 12 includes a first ball end 16 which may be removable held in a first base socket 22 located on a generally planar base unit surface 26, so as to form a ball-and-socket joint or attachment. Similarly, the second mounting arm 14 includes a second ball end 18 which may be removable held in a second base socket 24 located on the base unit surface 26. That is, the ball ends 16, 18 are removably attachable to respective base sockets 22, 24.

The first base socket 22 is spaced apart from the second base socket 24 on the base unit 20 by a dimension determined by the widths of the mounting arms 12, 14, and by the spacing required to allow the range of motions described below, as can be appreciated by one skilled in the art. Accordingly, the ball/socket configuration enables the mounting arms 12, 14 to swing in an arc of about ninety degrees in a horizontal direction with respect to the base unit 20, tilt upward at least ninety degrees in a vertical direction with respect to the base unit 20, and rotate three hundred sixty degrees within the respective base sockets 22, 24, as described in greater detail below.

The first mounting arm 12 also includes a first disc end 36 connected to the first ball end 16 by a first stem 28. The first mounting arm 12 includes a substantially planar magnet 32 (hidden from view) attached to the first disc end 36 and enclosed in a cover 33, to function as a mounting surface for an electronic device. The first disc end 36 has a substantially planar inner surface, at the first stem 28, and a substantially planar outer surface at the cover 33. Similarly, the second mounting arm 14 includes a second disc end 38 connected to the second ball end 18 by a second stem 29. The second mounting arm 14 may also include a magnet 34 (hidden from view) enclosed in a rubber or plastic cover 35 and secured to a disc end 38. The second disc end 38 also has a substantially planar inner surface, at the second stem 29, and a substantially planar outer surface at the cover 35.

The covers 33, 35 may be fabricated from a soft plastic or rubber material so as to prevent marring the surface of a secured phone, tablet, or other electronic device (not shown), and to provide a frictional surface for mitigating slippage of the secured phone, tablet, or other electronic device. Alternatively, the magnets 32, 34 and portions of the disc ends 36, 38 may be coated with a layer of plastic or rubber in place of the covers 33, 35. The disc ends 36, 38 themselves may be fabricated from a resilient material, such as a plastic or composite.

It can be appreciated by one skilled in the art that an electronic device with a metallic enclosure (not shown) can be removably secured to one or both of the mounting arms 12, 14 via the magnets 32, 34 to allow orienting and positioning of the electronic device(s) into a fixed position desired by the user. It should be understood that one or both of the magnets 32, 34 may comprise a round disc, an oval-shaped disc, an elliptically-shaped disc, an annular disc, or any other geometric shape that may optimize the effect and utility of the magnetic field emanating from the magnet 32, 34 used on a respective mounting arm 12, 14. In an exemplary embodiment, the magnets 32, 34 may comprise attachment magnets as disclosed in U.S. Pat. No. 8,706,175 "Phone and Tablet Stand," issued to the Applicant, and incorporated herein by reference in its entirety.

The dual mount phone and tablet stand 10 may further include a first upper securing flap 42 and a second upper securing flap 44. The upper securing flaps 42, 44 operate in conjunction with a lower securing flap 46 to secure the dual mount phone and tablet stand 10 to a support surface (not shown), as described in greater detail below.

Figure 3:
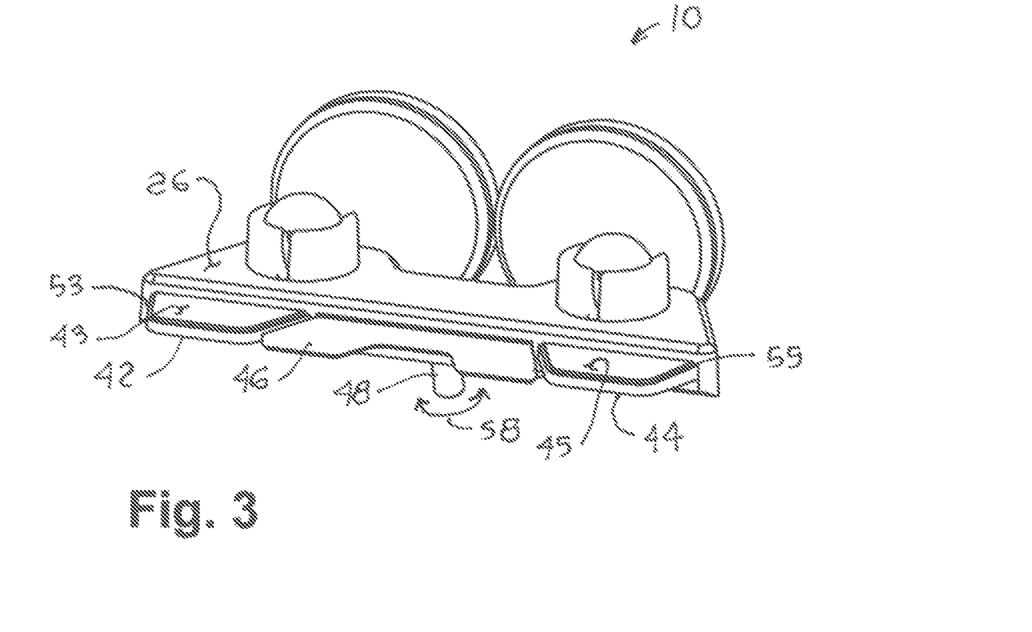
FIG. 3 is an isometric diagrammatical illustration of the dual mount phone and tablet stand of FIG. 1 as seen from the rear.

As best seen in FIG. 3, the dual mount phone and tablet stand 10 includes a flap adjustment knob 48 rotatably retained in a threaded hole 49 passing through the lower securing flap 46. In an exemplary embodiment, the lower securing flap 46 is disposed between the first upper securing flap 42 and the second upper securing flap 44. The flap adjustment knob 48 is operated by rotation, as indicated by arrow 58, and functions to pivot at least one of the first upper securing flap 42, the second upper securing flaps 44, and the lower securing flap 46, with respect to the base unit 20.

As shown in the illustration, an upper surface 53 of the first upper securing flap 42, and an upper surface 55 of the second upper securing flap 44 are substantially coplanar with the base unit surface 26. By "substantially coplanar" is meant that the upper surface 53 lies in a plane that is parallel to a plane containing the base unit surface 26, although there may be a small offset between the respective planes. Likewise, "substantially coplanar" also means that the upper surface 55 lies in a plane that is parallel to a plane containing the base unit surface 26, although there may similarly be a small offset between the respective planes. However, the upper surface 53 and the upper surface 55 are coplanar, without an offset. The first upper securing flap 42 may include a first soft pad 43 to avoid damage to a support surface, and the second upper securing flap 44 may include a second soft pad 45.

Figure 4:
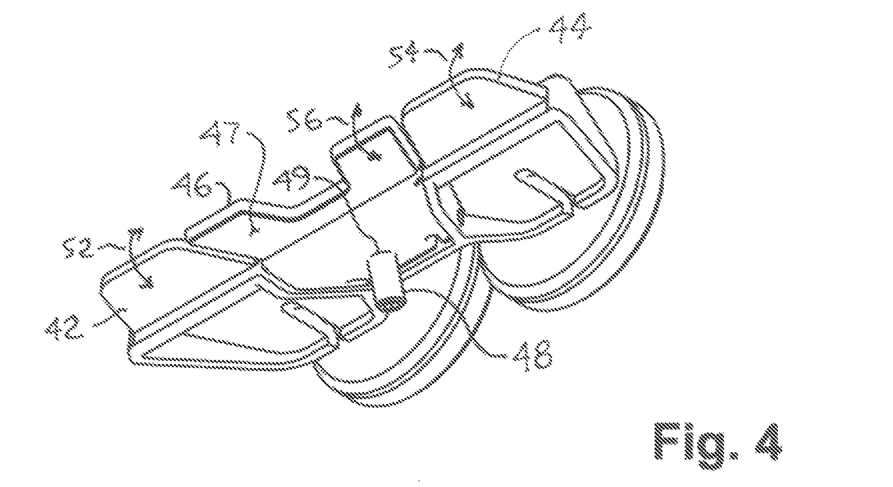
FIG. 4 is an isometric diagrammatical illustration of the dual mount phone and tablet stand of FIG. 1 as seen from the underside.
Figure 6:
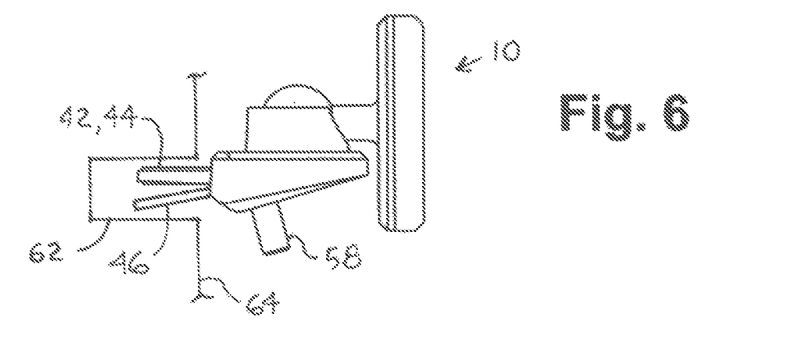
FIG. 6 is a side view of the dual mount phone and tablet stand of FIG. 1.

As best seen in FIG. 4, rotation of the flap adjustment knob 48 in the threaded hole 49 may function to: (i) pivot the first upper securing flap 42 in an up and down motion with respect to the base unit 20, as indicated by arrow 52, and/or (ii) pivot the lower securing flap 46 in an up and down motion with respect to the base unit 20, as indicated by arrow 56, and/or (iii) pivot the second upper securing flap 44 in an up and down motion with respect to the base unit 20, as indicated by arrow 54. In an exemplary embodiment, the first upper securing flap 42 and the second upper securing flap 44 remain fixed, and the flap adjustment knob 48 functions to pivot only the lower securing flap 46, as shown in FIG. 6. The lower securing flap 46 may include a soft pad 47 disposed on a lower surface of the lower securing flap 46.

Figure 7:
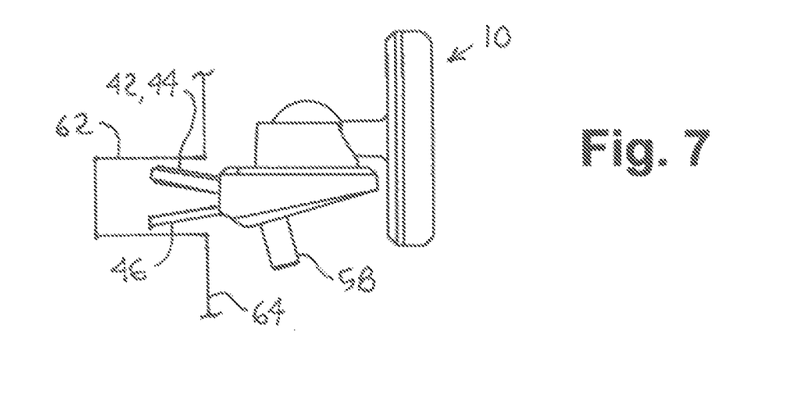
FIG. 7 shows operation of a locking tab in the dual mount phone and tablet stand of FIG. 6.

In an alternative configuration, the flap adjustment knob 48 functions to pivot both the first upper securing flap 42 and the second upper securing flap 44, while the lower securing flap 46 remains fixed. In yet another alternative configuration, the flap adjustment knob 48 functions to pivot all the first upper securing flap 42, the second upper securing flap 44, and the lower securing flap 46 (as shown in FIG. 7). That is, in this configuration, all three securing flaps pivot in response to the rotation of the flap adjustment knob 48.

Figure 5:
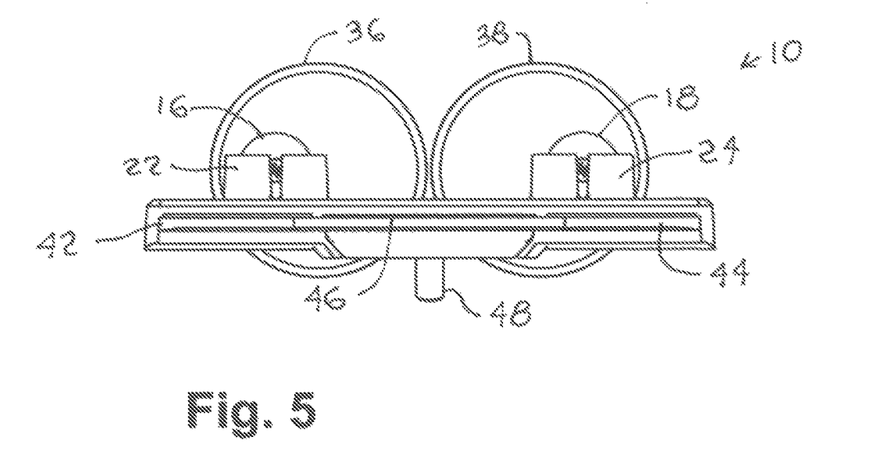
FIG. 5 is a rear view of the dual mount phone and tablet stand of FIG. 1.

In FIG. 5, there is shown a rear view of the dual mount phone and tablet stand 10. The illustration provides a view of the relative locations of the first mounting arm 12, the second mounting arm 14, the first base socket 22, the second base socket 24, the first upper securing flap 42, the lower securing flap 46, the second upper securing flap 44, and the flap adjustment knob 48. From this perspective, it can be seen that the first ball end 16 and stem 28 are offset from the center of the first disc end 36, and the second ball termination 18 is offset from the center of the second disc end 38, as shown in greater detail in FIG. 8.

FIG. 6 is a side view of the an exemplary embodiment of the dual mount phone and tablet stand 10 in which the first upper securing flap 42 and the second upper securing flap 44 are fixed, and the flap adjustment knob 48 functions to pivot or rotate only the lower securing flap 46 up and down. Note that the soft pad 43 on the first upper securing flap 42 and the soft pad 45 on the second upper securing flap 44 bear against an upper inside surface of an attachment recess 62 in a support structure 64. For clarity of illustration, a space is shown between the upper securing flaps and the upper inside surface although, in reality, the upper securing flaps 42, 44 make physical contact with the upper inside surface.

By rotating the flap adjustment knob 48 so as to move the soft pad 47 of the lower securing flap 46 against a lower inside surface of the attachment recess 62, the dual mount phone and tablet stand 10 is frictionally retained in the attachment recess 62. In an exemplary embodiment, the attachment recess 62 may comprise the compact disc (CD) loading slot of a CD player, as provided in many privately-owned vehicles. Accordingly, when the lower securing flap 48 and the upper securing flaps 42, 44 are not in a pivoted mode, the lower securing flap 48 and the upper securing flaps 42, 44 can be simultaneously inserted into the loading slot of the CD player. The flap adjustment knob 48 can then be rotated to pivot the lower securing flap 46 until the dual mount phone and tablet stand 10 is secured to the CD player.

FIG. 7 is a side view of the alternative configuration of a dual mount phone and tablet stand 60 in which the first upper securing flap 42, the second upper securing flap 44, and the lower securing flap 46 all function to pivot up and down as the flap adjustment knob 48 is rotated. In this configuration, the first upper securing flap 42 and the second upper securing flap 44 angle upward to bear against the upper inside surface of the attachment recess 62, and the lower securing flap 46 angles downward to bear against the lower inside surface of the attachment recess 62.

The dual mount phone and tablet stand 60 is thus frictionally retained in the attachment recess 62. It should be understood that the angular movements of the first upper securing flap 42, the second upper securing flap 44, and the lower securing flap 46 have been exaggerated for clarity of illustration, and that the pivoting movement of one or more of the first upper securing flap 42, the second upper securing flap 44, and the lower securing flap 46 may be only a few angular degrees to serve in securing the dual mount phone and tablet stands 10, 60 within the attachment recess.

Figure 8:
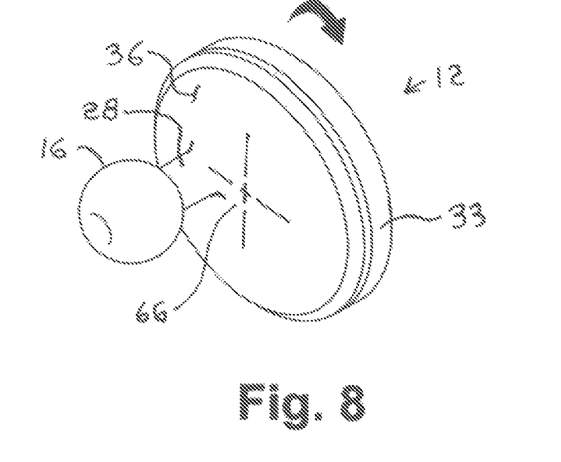
FIG. 8 is an isometric view of the mounting arm of FIG. 1.
Figure 9:
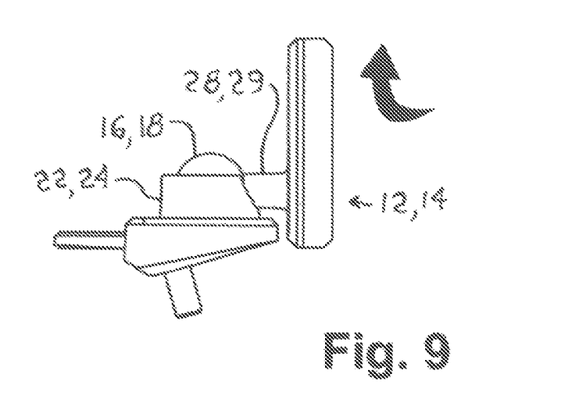
FIG. 9 is a side view of the dual mount phone and tablet stand of FIG. 1 showing the mounting arm in an upward position.
Figure 10:
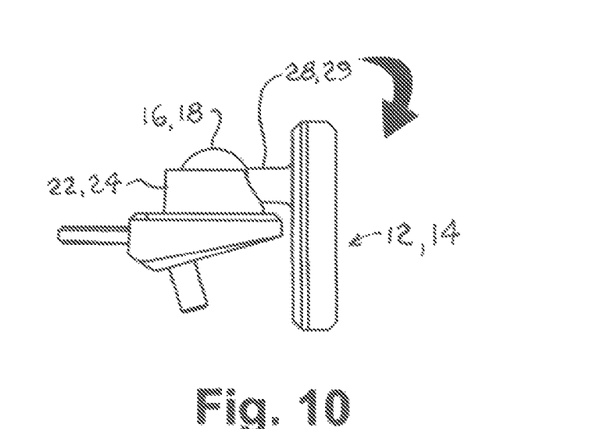
FIG. 10 is a side view of the dual mount phone and tablet stand of FIG. 1 showing the mounting arm in a downward position.

FIG. 8 is a detail view of the first mounting arm 12 showing the offset of the ball termination 16 from a center 66 of the first mounting arm 12. In the illustration, it can be seen that in this configuration, the cover 33 has been press-fitted over the first unitary component 36 such that the enclosed magnet 32 is not visible to the user. The second mounting arm 14 (not shown) may be similarly configured. Accordingly, this offset configuration allows the first mounting arm 12 to be rotated into a raised position, as shown in FIG. 9, or rotated into a lowered position, as shown in FIG. 10.

Figure 11:
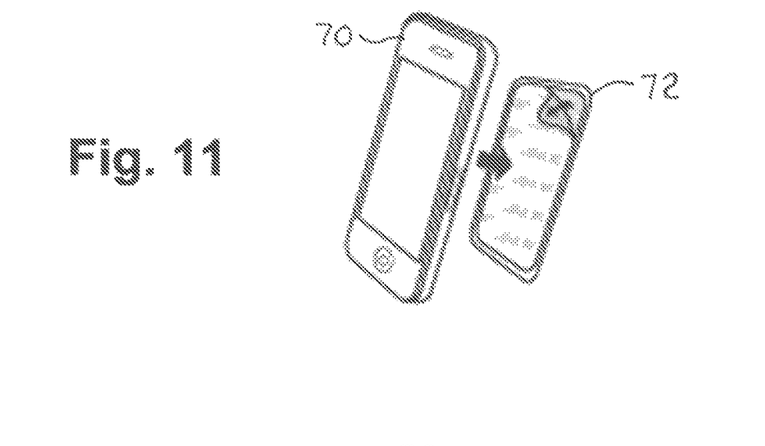
FIG. 11 is an isometric diagrammatical view of attaching a metallic plate to the backside of a mobile communication device.

There is shown in FIG. 11 a conventional mobile communication device 70, such as a SMARTPHONE, an iPHONE, or an ANDROID, for example. Such mobile communication devices 70 are typically housed in a plastic, non-metallic shell, and would not be attachable to the magnet 32 on the first mounting arm 12. For such devices, a metallic plate 72 may be attached to the backside of the respective mobile communication device 70. The metallic plate 72 may be held in place by a releasable adhesive, as is known in the relevant art.

Figure 12:
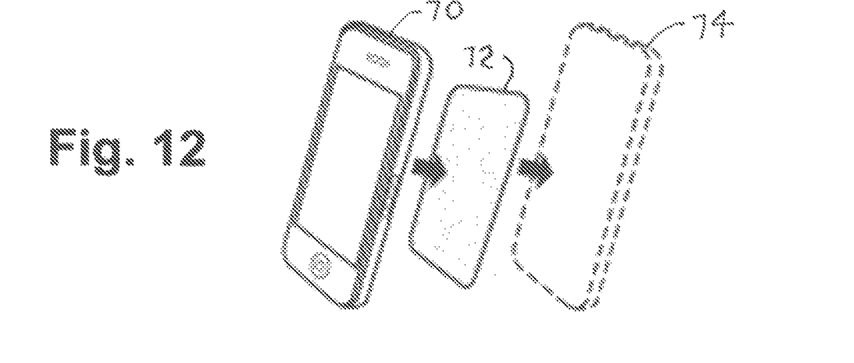
FIG. 12 is an isometric diagrammatical view of installing a metallic plate between a mobile communication device and a protective case for the communication device.
Figure 13:
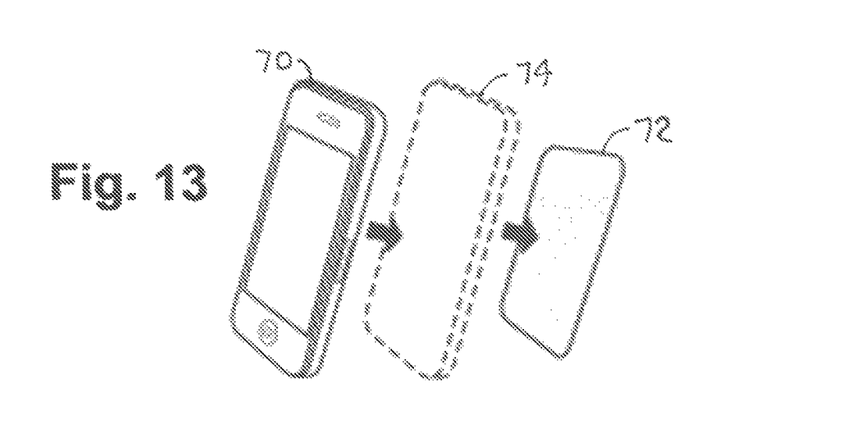
FIG. 13 is an isometric diagrammatical view of attaching a metallic plate to the outside of a protective cover for a mobile communication device.

In an alternate configuration, the metallic plate 72 may be slipped into a protective case 74 configured for holding the mobile communication device 70, as shown in FIG. 12. Or, in yet another alternative configuration, shown in FIG. 13, the metallic plate 72 may be attached to either the outside or the inside of the protective case 74, such as by an adhesive. In another configuration (not shown), the metallic plate 72 can be inserted into the mobile communication device 70, for example, between a battery and a battery cover. In all configurations, the metallic plate 72 provides the metallic component necessary to attract the mobile communication device 70 to the magnetic disc 32.

Figure 14:
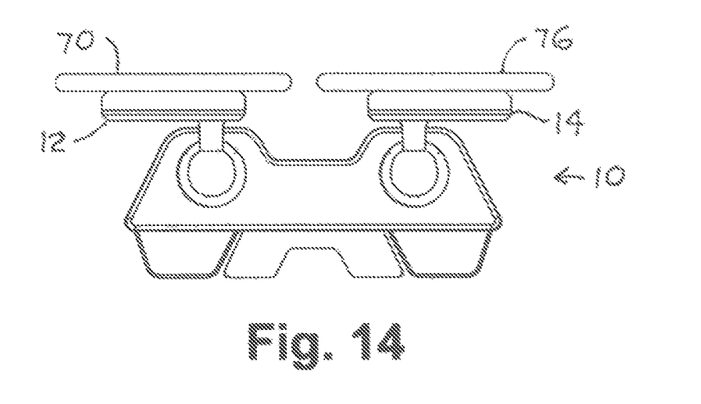
FIG. 14 is a top view of the dual mount phone and tablet stand of FIG. 1 with a mobile communication device attached to each of the mounting arms.

FIG. 14 shows a typical application for the dual mount phone and tablet stand 10. The mobile communication device 70 is shown attached to the first mounting arm 12 for a first user, and a second mobile communication device 76 is shown attached to the second mounting arm 14 for a second user. It can be appreciated by one skilled in the art that the dual mount phone and tablet stand 10 provides for supporting two different mobile communication devices by attachment to the loading slot of a compact disc player, for example, thus leaving the hands of the vehicle driver free. In addition, the mobile communication devices can be oriented in different directions to face the respective users by repositioning the mounting arms 12, 14 with respect to the dual mount phone and tablet stand 10.

Figure 15:
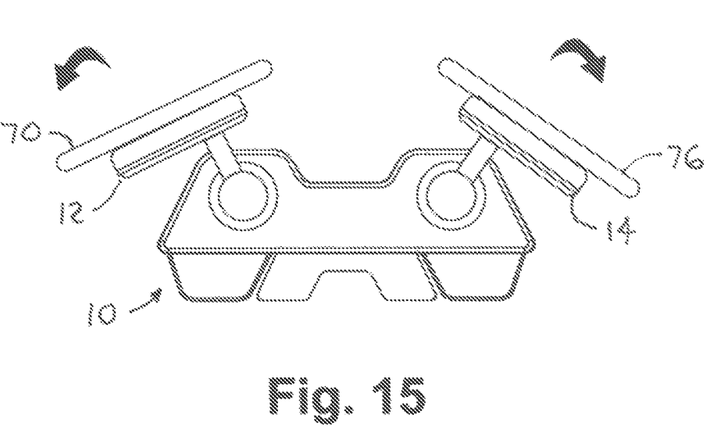
FIG. 15 is a top view of the dual mount phone and tablet stand of FIG. 14 showing rotation and repositioning of the mounting arms.

As shown in FIG. 15, the second mobile communication device 76 has been rotated to substantially face the driver of the vehicle, and the first mobile communication device 70 has been rotated to substantially face a passenger in the vehicle. Note that the offset features in the first mounting arm 12 and the second mounting arm 14 allow for the respective mobile devices to face substantially rearward in the passenger compartment, as in FIG. 14, or towards the driver and passenger, as in FIG. 15, or at intermediate positions, without causing either mobile communication device to physically interfere with the other.

Figure 16:
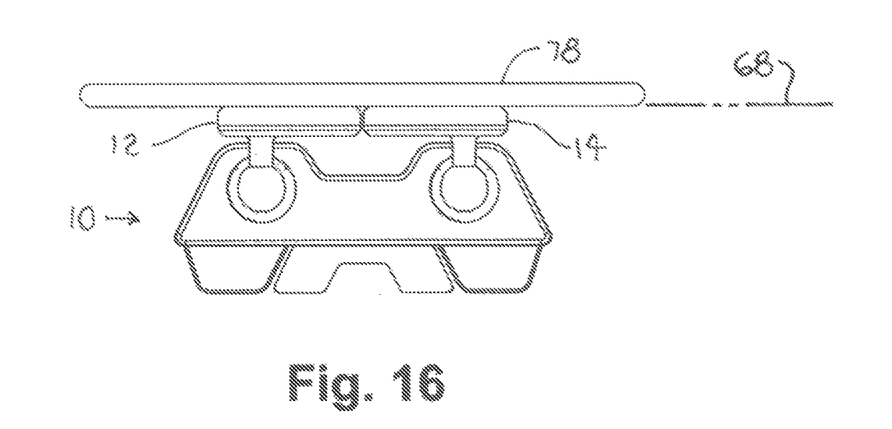
FIG. 16 is a top view of the dual mount phone and tablet stand of FIG. 1 with a computer tablet attached to both of the mounting arms.

As shown in FIG. 16, the first mounting arm 12 and the second mounting arm 14 may be positioned adjacent one another, with the respective covers 33, 35 oriented in a co-planar configuration, as indicated by a planar surface 68, to form a wide mounting surface area, such as may be appropriate for a computer tablet 78. The resulting configuration provides a secure level of support for a heavier unit, such as the computer tablet 78, even in the random motion environment of an automobile.

Figure 17:
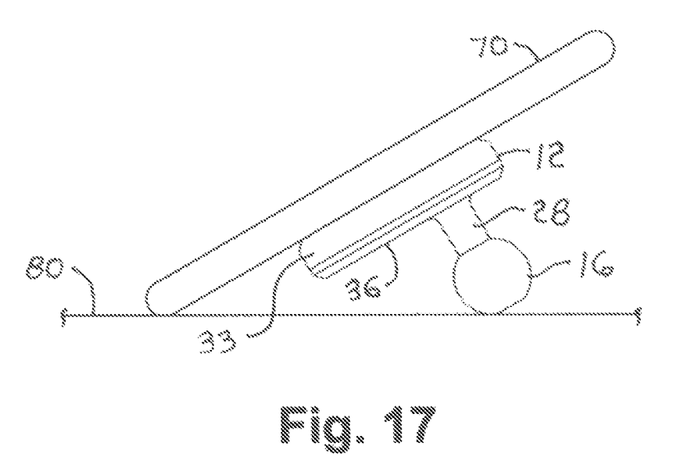
FIG. 17 is a side view of one of the communication devices of FIG. 14 removed from the base unit and held at a shallow angle for viewing by the mounting arm.
Figure 18:
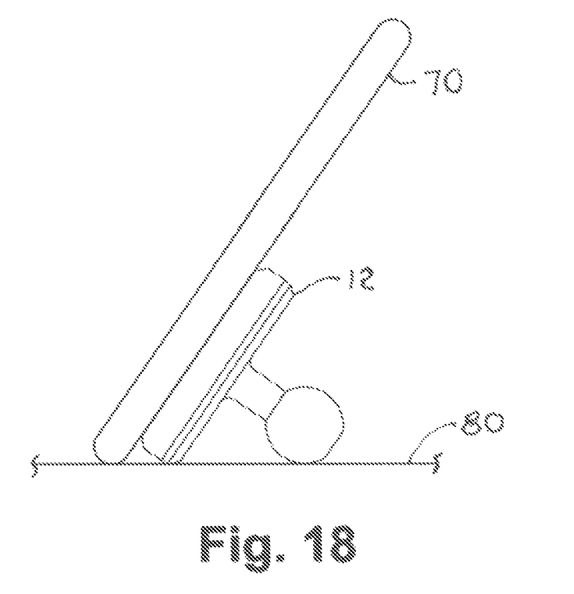
FIG. 18 is a side view of the communication device of FIG. 17 with the mounting arm relocated to provide a different angle of viewing.

It can be appreciated that the mobile communication device 70 can be removed from the dual mount phone and tablet stand 10 with the first mounting arm 12 still attached, as shown in FIG. 17. In this configuration, the mobile communication device 70 can be set on a surface 80 in a tilted-upward position to allow for viewing the display. As seen in the illustration, the cover 33 is disposed between the magnet 32 (hidden from view) and the mobile communication device 70. The first mounting arm 12 also includes a cylindrical stem 68 connected to the ball termination 16. The first mounting arm 12 can be repositioned on the mobile communication device 70, as shown in FIG. 18, to provide a different tilted-up configuration on the surface 80, as desired. The second mounting arm 14 is configured similarly to the first mounting arm 12.

It is to be understood that the description herein is only exemplary of the invention, and is intended to provide an overview for the understanding of the nature and character of the disclosed dual mounting system. The accompanying drawings are included to provide a further understanding of various features and embodiments of the method and devices of the invention which, together with their description serve to explain the principles and operation of the invention.

What is claimed is:

1. A dual mount phone and tablet stand comprising:
   a base unit having a substantially planar base unit surface, said base unit including a first base socket and a second base socket disposed on said base unit surface, said first base socket in spaced apart relationship to said second base socket;
   a first mounting arm having a first planar disc end, a first ball end, and a first stem extending between said first planar disc end and said first ball end, said first ball end configured so as to be removably attachable to said first base socket;
   a second mounting arm having a second planar disc end, a second ball end, and a second stem extending between said second planar disc end and said second ball end, said second ball end configured so as to be removably attachable to said second base socket;
   a first magnet secured to said first mounting arm;
   a second magnet secured to said second mounting arm;
   at least one upper securing flap extending from said base unit;
   a lower securing flap extending from said base unit; and
   a flap adjustment knob rotatably operable to pivot, with respect to said base unit, one of said at least one upper securing flap and said lower securing flap.

2. The dual mount phone and tablet stand of claim 1 wherein said first ball end forms a ball and socket joint when inserted into said first base socket.

3. The dual mount phone and tablet stand of claim 1 wherein said first mounting arm comprises a first cover enclosing said first magnet, and said second mounting arm comprises a second cover enclosing said second magnet.

4. The dual mount phone and tablet stand of claim 3 wherein said first mounting arm and said second mounting arm are both sized and configured so as to enable a surface of said first cover to be positioned substantially coplanar with a surface of said second cover.

5. The dual mount phone and tablet stand of claim 1 wherein an upper surface of said first upper securing flap is substantially coplanar with said base unit surface.

6. The dual mount phone and tablet stand of claim 5 comprising a second upper securing flap extending from said base unit, said second upper securing flap having an upper surface substantially coplanar with said upper surface of said first upper securing flap.

7. The dual mount phone and tablet stand of claim 6 comprising a first soft pad disposed on said upper surface of said first upper securing flap and a second soft pad disposed on a said upper surface of said second upper securing flap.

8. The dual mount phone and tablet stand of claim 6 wherein said first upper securing flap, said second upper securing flap, and said lower securing flap are configured to simultaneously fit into a compact disc loading slot of a compact disc player.

9. The dual mount phone and tablet stand of claim 1 wherein said flap adjustment knob is rotatably retained in a threaded hole in said lower securing flap.

10. The dual mount phone and tablet stand of claim 1 further comprising a metallic plate for removable attachment to a selected mobile communication device, said metallic plate for enabling magnetic attachment of said selected mobile communication device to at least one of said first mounting arm and said second mounting arm.

11. The dual mount phone and tablet stand of claim 1 wherein said first magnet comprises one of a round disc, an oval-shaped disc, an elliptically-shaped disc, or an annular disc.

12. A dual mount phone and tablet stand comprising:
    a base unit having a substantially planar surface, said base unit including a first base socket and a second base socket disposed on said planar surface;
    a first mounting arm having a first planar end, a first ball end, and a first stem extending between said first planar end and said first ball end, said first ball end removably attached to said first base socket;
    a second mounting arm having a second planar disc end, a second ball end, and a second stem extending between said second planar end and said second ball end, said second ball end removably attached to said second base socket;
    a first disc-shaped magnet secured to said first planar end;
    a second disc-shaped magnet secured to said second planar end;
    a first upper securing flap extending from said base unit, said first upper securing flap having a surface substantially coplanar with said base unit surface;
    a second upper securing flap extending from said base unit; said second upper securing flap having a surface substantially coplanar with said base unit surface;
    a lower securing flap extending from said base unit and disposed between said first upper securing flap and said second upper securing flap; and
    a flap adjustment knob rotatably retained in a threaded hole disposed in said lower securing flap.

13. The dual mount phone and tablet stand of claim 12 wherein said first mounting arm comprises a first cover enclosing said first magnet and said second mounting arm comprises a second cover enclosing said second magnet.

14. The dual mount phone and tablet stand of claim 13 wherein said first mounting arm and said second mounting arm are both sized and configured so as to enable a surface of said first cover to be positioned substantially coplanar with a surface of said second cover.

15. The dual mount phone and tablet stand of claim 12 comprising a first soft pad disposed on said upper surface of said first upper securing flap, a second soft pad disposed on a said upper surface of said second upper securing flap, and a third soft pad disposed on a lower surface of said lower securing flap.

16. The dual mount phone and tablet stand of claim 12 wherein said first upper securing flap, said second upper securing flap, and said lower securing flap are configured to simultaneously fit into a compact disc loading slot of a compact disc player.

17. The dual mount phone and tablet stand of claim 12 further comprising a metallic plate for removable attachment to a selected mobile communication device, said metallic plate for enabling attachment of said selected mobile communication device to at least one of said first mounting arm and said second mounting arm.

18. The dual mount phone and tablet stand of claim 12 further comprising a metallic plate for removable attachment to one of the outside or the inside of a protective case configured for holding a selected mobile communication device, said metallic plate for enabling attachment of said selected mobile communication device to at least one of said first mounting arm and said second mounting arm.

19. The dual mount phone and tablet stand of claim 12 wherein said first stem is attached to said first planar end at a location offset from a center point of said first planar end.

20. The dual mount phone and tablet stand of claim 12 wherein said first mounting arm is configured to swing in an arc of up to substantially ninety degrees in a horizontal direction with respect to said base unit, and tilt upward at up to substantially ninety degrees in a vertical direction with respect to said base unit.

\* \* \* \* \*